(12) United States Patent
Akita et al.

(10) Patent No.: US 6,659,385 B2
(45) Date of Patent: Dec. 9, 2003

(54) WIRE-WINDING MACHINE AND A WIRE-WINDING METHOD FOR MAKING WINDINGS OF A ROTARY ELECTROMECHANICAL DEVICE

(75) Inventors: Hiroyuki Akita, Tokyo (JP); Yuji Nakahara, Tokyo (JP); Nobuaki Miyake, Tokyo (JP); Kazuya Omura, Tokyo (JP); Keiji Takai, Tokyo (JP); Kazunari Tomita, Tokyo (JP); Naoki Kawasugi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 114 days.

(21) Appl. No.: 09/922,686

(22) Filed: Aug. 7, 2001

(65) Prior Publication Data

US 2002/0050541 A1 May 2, 2002

(30) Foreign Application Priority Data

Oct. 30, 2000 (JP) ........................ 2000-331005

(51) Int. Cl.⁷ ............................................ H02K 15/085
(52) U.S. Cl. ..................... 242/432.6; 310/218; 336/212
(58) Field of Search ................. 242/432, 432.6; 310/216, 217, 218; 336/233, 234, 212

(56) References Cited

U.S. PATENT DOCUMENTS 4,048,605 A * 9/1977 McCollum ................. 336/176
5,729,072 A * 3/1998 Hirano et al. .............. 310/258
5,986,377 A * 11/1999 Yamada et al. ............. 310/216
6,369,687 B1 * 4/2002 Akita et al. ................. 336/234

FOREIGN PATENT DOCUMENTS

| JP | 10066313 | 3/1998 |
| JP | 11098774 | 4/1999 |
| JP | 11178290 | 7/1999 |
| JP | 11187630 | 7/1999 |

OTHER PUBLICATIONS

Hiroyuki Akita et al., U.S. patent application Ser. No. 09/342,249, filed Jun. 29, 1999, pp. 1–66.

* cited by examiner

Primary Examiner—Emmanuel Marcelo
(74) Attorney, Agent, or Firm—Burns, Doane, Swecker & Mathis, LLP

(57) ABSTRACT

A wire-winding machine for forming coils (20) on individual magnetic pole teeth (11a) of a core member (13) which is produced by joining a plurality of core segments (11), each of the core segments (11) having a yoke portion (11c) and a magnetic pole tooth (11a) projectingly formed on an inside surface (11d) of the yoke portion (11c), comprises a core member positioner including a rotating roller (14), large-diameter guide rollers (21) and small-diameter guide rollers (22) which together serve to bend the core member (13) and hold it in a position where the core segments (11.3, 11.5) adjacent to the core segment (11.4) on which the coil (20) is currently wound do not project in the direction of its magnetic pole tooth (11a) beyond a boundary surface (S) of the yoke portion (11c) of the core segment (11.4) on which the coil (20) is currently wound.

12 Claims, 9 Drawing Sheets

WIRE-WINDING MACHINE AND A WIRE-WINDING METHOD FOR MAKING WINDINGS OF A ROTARY ELECTROMECHANICAL DEVICE

BACKGROUND OF THE INVENTION AND RELATED ART STATEMENT

The present invention relates to a wire-winding machine and a wire-winding method for winding wires on individual magnetic pole teeth of a core member of a rotary electromechanical device, the core member being formed by joining a plurality of core segments in beltlike form by means of connectors which serve as points of bending. More particularly, the invention is concerned with a construction for achieving improved neatness of alignment of windings.

A conventional wire-winding machine 1 of this kind disclosed in Japanese Laid-open Patent Publication No. 11-98774, for instance, is constructed such that coils 5 are formed by successively winding magnet wires 4 around individual magnetic pole teeth 3a through nozzles 1a, the magnetic pole teeth 3a projecting to the outside of a core member 3 which is joined in beltlike form by connectors and wound around drums 2a of the wire-winding machine 1, as shown in FIGS. 9 and 10.

Another conventional wire-winding machine 6 disclosed in Japanese Laid-open Patent Publication No. 11-187630, for instance, is constructed such that magnet wires 9 which are moved along a transport guide 7 having an arc-shaped path in the direction of arrows shown in FIG. 11 are successively wound around individual magnetic pole teeth 8a through nozzles 6a, the magnetic pole teeth 8a projecting to the inside of a core member 8 which is joined in beltlike form by connectors, as illustrated in FIG. 11.

As mentioned above, the conventional wire-winding machines 1, 6 are intended to improve the efficiency of wire-winding operation by simultaneously winding three coils 5, 10 with the beltlike core members 3, 8 arranged in arc-shaped form, respectively. In a case where the magnet wires 4 are wound on the core member 3 which is arranged such that the magnetic pole teeth 3a are positioned on the outside of a bent structure with slots in the core member 3 widening outward as shown in FIG. 9, not to mention a case where the magnet wires 9 are wound on the core member 8 which is arranged such that the magnetic pole teeth 8a are positioned on the inside of a bent structure as shown in FIG. 11, however, it is difficult to make sufficient space for the wire-winding operation available. For this reason, there is no alternative but to position the nozzles 1a, 6a parallel to the axes of the respective magnetic pole teeth 3a, 8a in either case so that the radius of curvature of the magnet wires 4, 9 at inside diameter corner portions of outlet openings of the individual nozzles 1a, 6a (indicated by "A" in the Figure) decreases as shown in FIG. 12. As a consequence, frictional resistance between the individual magnet wires 4, 9 and the corner portions differs and tensile force exerted on the individual magnet wires 4, 9 varies depending on the moving positions of the individual nozzles 1a, 6a under the wire-winding operation, or under conditions where the magnet wires 4, 9 are located as depicted by solid and broken lines in the Figure, for example, so that there has been a problem that it is difficult to wind the magnet wires 4, 9 in a neatly aligned manner.

SUMMARY OF THE INVENTION

The present invention has been made to solve the aforementioned problems of the prior art. Accordingly, it is an object of the invention to provide a wire-winding machine and a wire-winding method which make it possible to prevent deformation of coils during the winding of magnet wires to achieve improved neatness of alignment of windings.

In a wire-winding machine of the invention for forming coils on an iron core of a rotary electromechanical device, the iron core is constructed of a core member which is formed by joining a plurality of core segments, each of the core segments has a yoke portion and a magnetic pole tooth which is projectingly formed on an inside surface of the yoke portion, each of the coils is formed around the magnetic pole tooth, and the core member is formed by joining both ends of the individual yoke portions by means of connectors which serve as points of bending.

According to a principal feature of the invention, this wire-winding machine comprises a wire feeder which is constructed to wind the coils on the magnetic pole teeth as wire outlet ends of the wire feeder turn around the individual magnetic pole teeth, and a core member positioner which causes the core member to bend at the connectors in such a way that the magnetic pole teeth are positioned on the outside or inside of a bent structure, and holds the core member in positions where the core segments adjacent to each core segment which is currently a subject of wire-winding operation performed by the wire feeder do not project in the direction of its magnetic pole tooth beyond a boundary surface including the inside surface of the yoke portion of each core segment which is currently a subject of the wire-winding operation during the wire-winding operation.

According to the aforementioned construction of the wire-winding machine, it is possible to prevent deformation of the coils potentially caused when winding magnet wires and achieve improved neatness of alignment of windings.

In one aspect of the invention, the core member positioner has a mechanism which moves the core member in such a way that the individual core segments are sequentially fed into an operating area of the wire feeder.

This construction serves to wind the magnet wires smoothly and efficiently.

In another aspect of the invention, the core member positioner has a turning device which can bend at least three successive core segments along a peripheral surface and lock them in position in such a way that their magnetic pole teeth are positioned on the outside of the bent structure.

This makes it possible to easily construct the core member positioner and provide a wire-winding machine capable of achieving improved neatness of alignment of windings.

In still another aspect of the invention, the core member positioner includes a plurality of chucks which can bend a specific number of the core segments arranged at specific intervals along the core member and the core segments adjacent to those core segments and lock them in position in such a way that their magnetic pole teeth are positioned on the outside of the bent structure, and a retaining device which bends and holds the multiple core segments located between the core segments locked by the chucks in such a way that the magnetic pole teeth are positioned on the inside of the bent structure, wherein the coils are formed around the core segments locked by the chucks.

This construction also makes it possible to easily construct the core member positioner and provide a wire-winding machine capable of achieving improved neatness of alignment of windings.

In a further aspect of the invention, the wire feeder has fliers which guide the wires in such a way that the direction in which each of the wires is let out always matches a radial direction of the relevant magnetic pole tooth at its corresponding wire outlet end.

This construction makes it possible to provide a wire-winding machine capable of achieving improved neatness of alignment of windings.

In a wire-winding method of the invention for forming coils on an iron core of a rotary electromechanical device, the iron core is constructed of a core member which is formed by joining a plurality of core segments, each of the core segments has a yoke portion and a magnetic pole tooth which is projectingly formed on an inside surface of the yoke portion, each of the coils is formed around the magnetic pole tooth, and the core member is formed by joining both ends of the individual yoke portions by means of connectors which serve as points of bending.

According to another principal feature of the invention, this wire-winding method comprises the steps of bending the core member in such a way that the magnetic pole teeth are positioned on the outside or inside of a bent structure, and forming the coils on one core segment while holding the core segments in positions where the core segments adjacent to the one core segment do not project in the direction of its magnetic pole tooth beyond a boundary surface including the inside surface of the yoke portion of the one core segment.

This wire-winding method makes it possible to prevent deformation of the coils potentially caused when winding magnet wires and achieve improved neatness of alignment of windings.

These and other objects, features and advantages of the invention will become more apparent upon reading the following detailed description in conjunction with the accompanying drawings

BRIEF DESCRIPTION OF THE DRAWINGS

FIGS. 4A and 4B show the construction of a rotating roller of the wire-winding machine of FIG. 1, of which FIG. 4A is a front view and FIG. 4B is a sectional view showing the cross section taken along lines B—B of FIG. 4A;

FIGS. 5A and 5B show the construction of individual components of the rotating roller of FIGS. 4A and 4B, of which FIG. 5A is a front view of a first ratchet wheel and FIG. 5B is a front view of a second ratchet wheel;

DETAILED DESCRIPTION OF THE PREFERRED EMBODIMENTS OF THE INVENTION

Now, embodiments of the invention are described below with reference to the drawings.

First Embodiment

Figure 1:
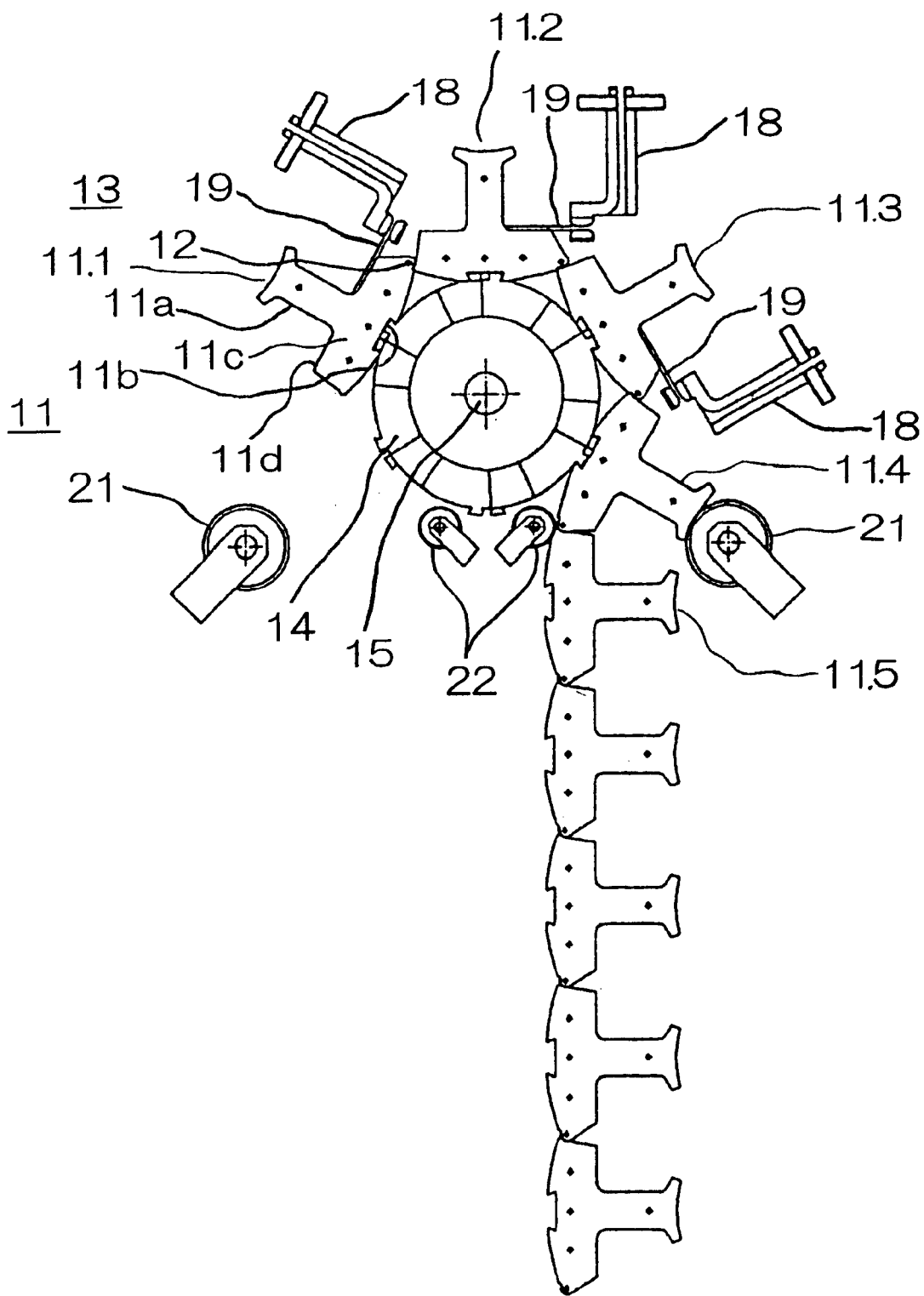
FIG. 1 is a diagram showing the construction of a wire-winding machine according to a first embodiment of the present invention and one process of wire-winding operation performed by the wire-winding machine.
Figure 2:
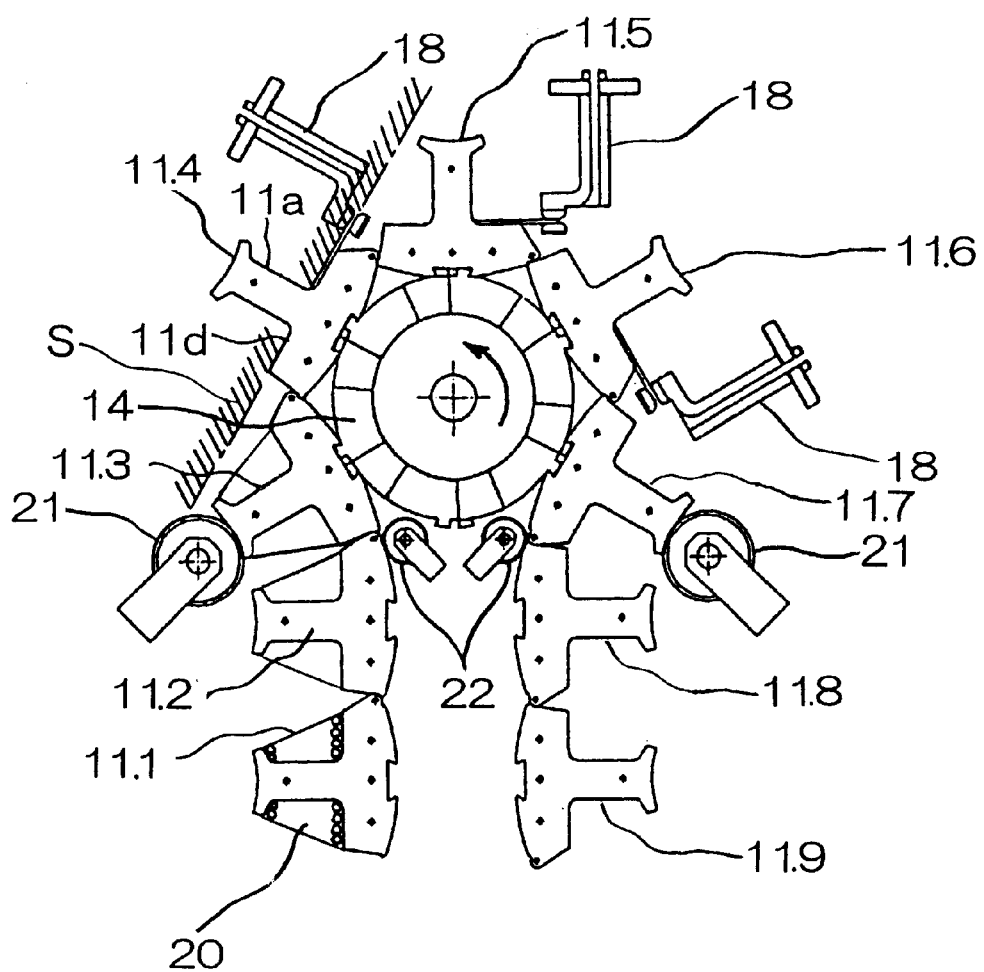
FIG. 2 is a diagram showing a process of the wire-winding operation performed by the wire-winding machine succeeding to the process of FIG. 1.
Figure 3:
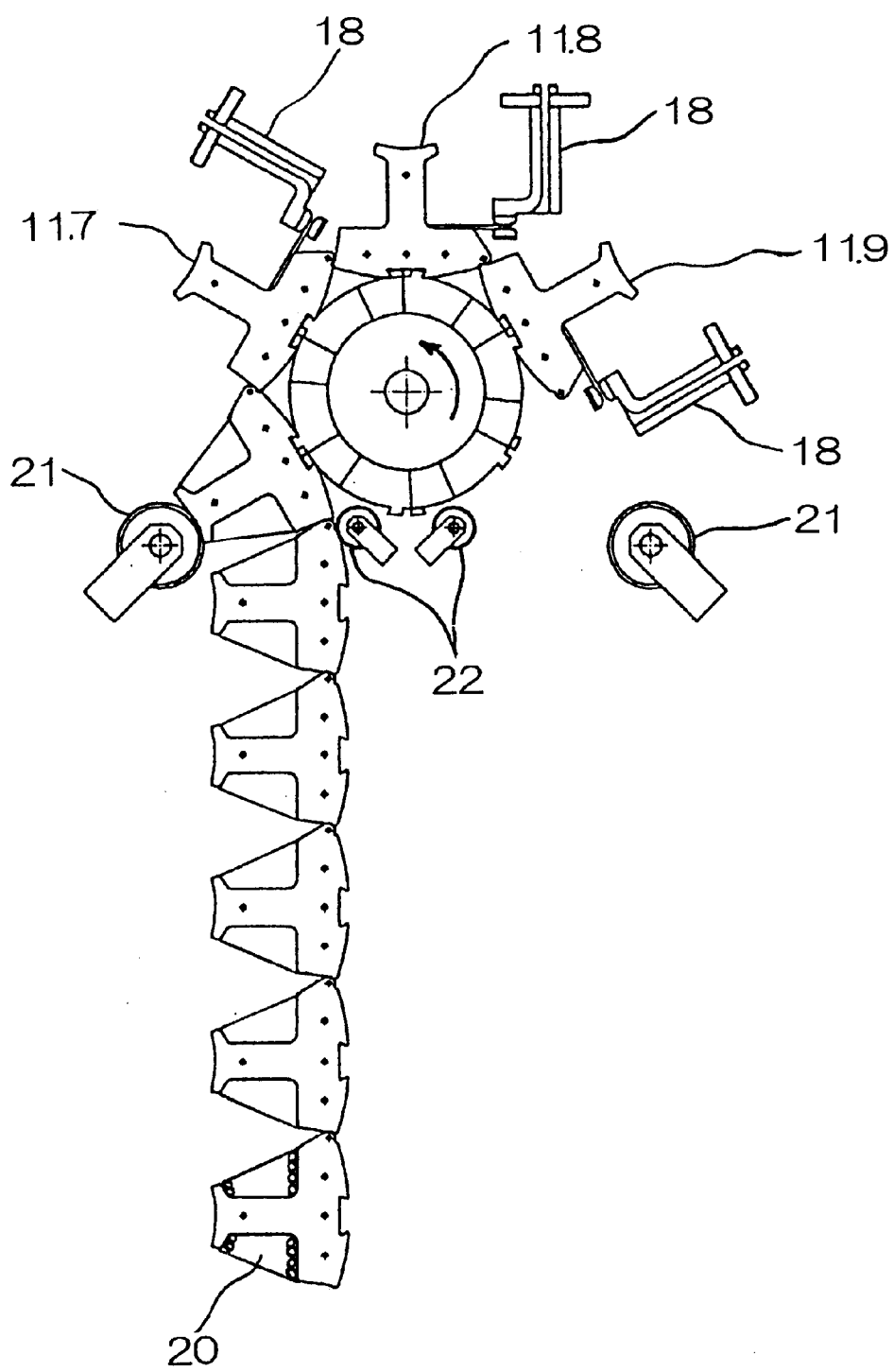
FIG. 3 is a diagram showing a process of the wire-winding operation performed by the wire-winding machine of FIG. 1 succeeding to the process of FIG. 2.
Figure 4A:
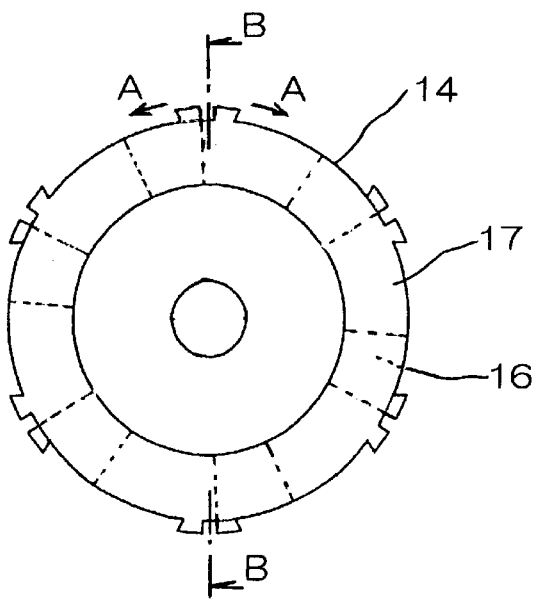
Figure 4B:
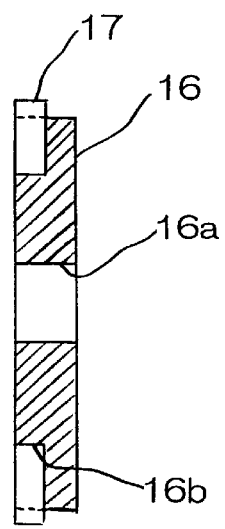
Figure 5A:
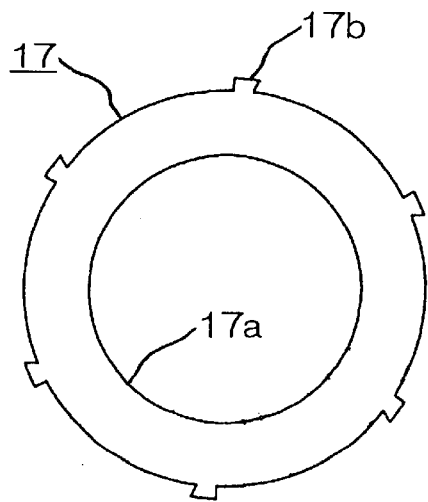
Figure 5B:
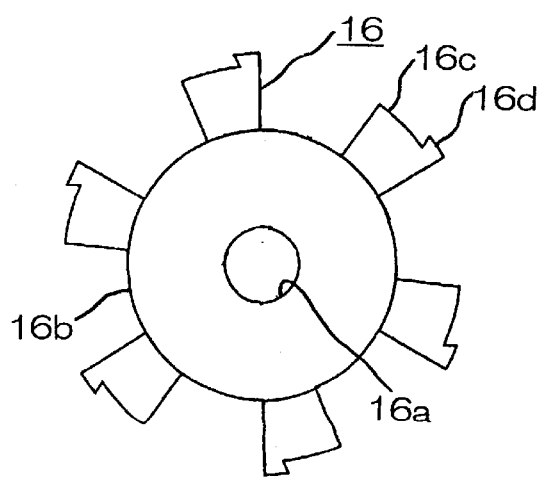
Figure 6:
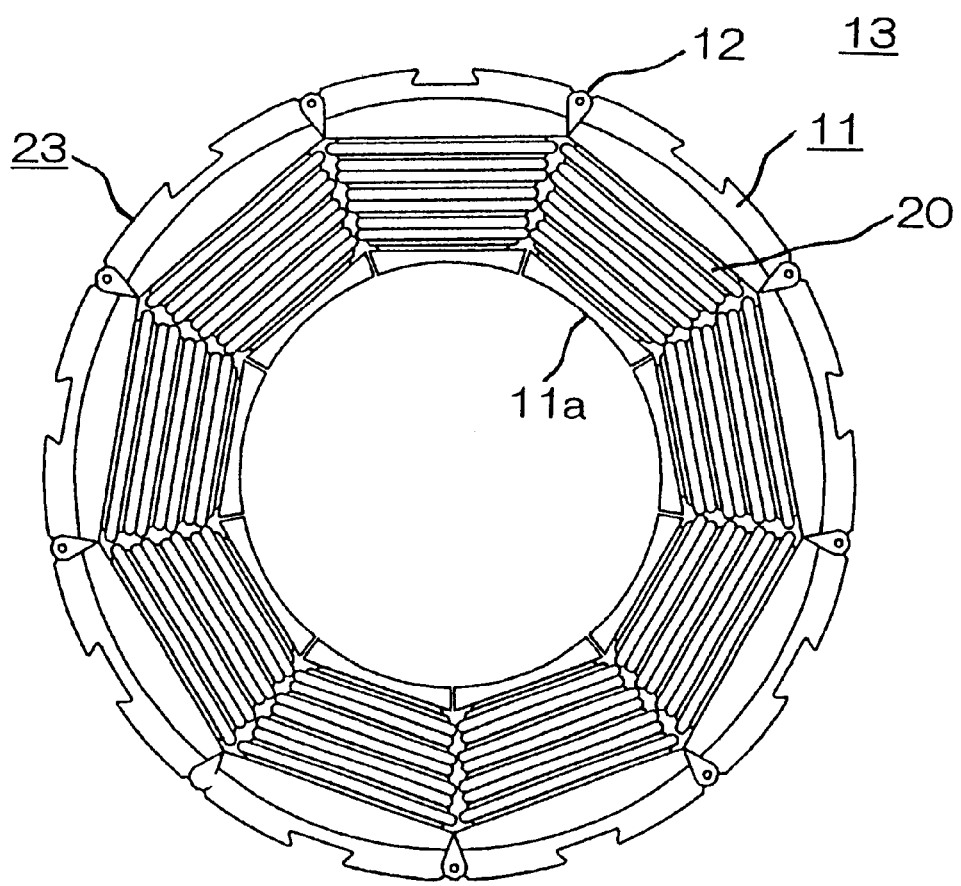
FIG. 6 is a front view showing the construction of a stator completed by performing the wire-winding operation with the wire-winding machine of FIG. 1.

FIG. 1 is a diagram showing the construction of a wire-winding machine according to a first embodiment of the present invention and one process of wire-winding operation performed by the wire-winding machine; FIG. 2 is a diagram showing a process of the wire-winding operation performed by the wire-winding machine succeeding to the process of FIG. 1; FIG. 3 is a diagram showing a process of the wire-winding operation performed by the wire-winding machine of FIG. 1 succeeding to the process of FIG. 2; FIGS. 4A and 4B show the construction of a rotating roller 14 of the wire-winding machine of FIG. 1, of which FIG. 4A is a front view and FIG. 4B is a sectional view showing the cross section taken along lines B—B of FIG. 4A; FIGS. 5A and 5B show the construction of individual components of the rotating roller 14 of FIGS. 4A and 4B, of which FIG. 5A is a front view of a first ratchet wheel 16 and FIG. 5B is a front view of a second ratchet wheel 17; and FIG. 6 is a front view showing the construction of a stator completed by performing the wire-winding operation with the wire-winding machine of FIG. 1.

In these Figures, designated by the numeral 11 (11.1,11.2, 11.3,11.4,11.5,11.6,11.7,11.8,11.9) are a plurality of core segments each including a yoke portion 11c and a magnetic pole tooth 11a projecting from an inside surface 11d of the yoke portion 11c, wherein a locking groove 11b which locks on the later-described rotating roller 14 is formed at the middle of an outer surface of the yoke portion 11c. Designated by the numeral 12 are connecting members serving as connectors which are disposed bendably between the individual core segments 11 and join them together in beltlike form, the connecting members 12 forming a core member 13 together with the core segments 11. Designated by the numeral 14 is the rotating roller serving as a core member positioner which is driven to intermittently turn by an unillustrated driver via a rotary shaft 15. As illustrated in FIGS. 4A, 4B, 5A and 5B, the rotating roller 14 includes the first ratchet wheel 16 having a through hole 16a at a central part that is fitted on the rotary shaft 15, a boss portion 16b formed to a smaller diameter on one side, a plurality of flange portions 16c formed to a larger diameter on the opposite side at specific angular intervals, and pawls 16d individually formed projectingly to the outside of the flange portions 16c at one end in a circumferential direction, the pawls 16d being capable of fitting in the locking grooves 11b in the core segments 11, as well as the ring-shaped second ratchet wheel 17 having an through hole 17a formed at a central part that is slidably fitted on the boss portion 16b of the first ratchet wheel 16 and pawls 17b projectingly formed on the outer periphery of the first ratchet wheel 16 at the same angular intervals as the pawls 16d of the first ratchet wheel 16, the pawls 17b being capable of fitting in the locking grooves 11b in the core segments 11.

Designated by the numeral 18 are three fliers which are mounted on wire-winding heads as unillustrated wire feeders. These fliers 18 are disposed such that they are individually positioned just beside three consecutive core segments 11 which are engaged with the rotating roller 14, and form coils 20 by winding magnet wires 19 around the individual magnetic pole teeth 11a. These fliers 18 guide the wires 19 in such a way that the direction in which each wire 19 is let out always matches a radial direction of the corresponding magnetic pole tooth 11a, or the direction of its axis, at a wire outlet end of each flier 18. Designated by the numeral 21 is a pair of rotatable large-diameter guide rollers which are disposed such that they individually go into contact with terminal ends of the magnetic pole teeth 11a of the core segments 11 that are located ahead and behind the three core segments 11 positioned just beside the fliers 18, and designated by the numeral 22 is a pair of rotatable small-diameter guide rollers which are disposed such that they individually go into contact with the connecting members 12 between the core segments 11 with which the two large-diameter guide rollers 21 come into contact and the adjacent core segments 11 located ahead and behind those two core segments 11.

Now, the operation of the wire-winding machine of the first embodiment constructed as stated above is described with reference to the individual drawings.

First, the pawls 16d, 17b of the rotating roller 14 fit into the locking grooves 11b of the core segment 11.1 at the forwardmost position (hereinafter referred to simply as the core segment 11.1). Here, the rotating roller 14 locks with the core segment 11 at the forwardmost position as the first and second ratchet wheels 16, 17 are once relatively moved opposite to the directions of arrows A from the positions shown in FIG. 4A and, then, relatively moved in the directions of the arrows A.

Subsequently, at a point where the rotating roller 14 has turned counterclockwise by as much as an angle corresponding to one core segment 11, the rotating roller 14 locks anew with the core segment 11.2 second from the first one in the same manner as described above. The rotating roller 14 repeatedly performs the similar action. In FIG. 1, four core segments 11.1–11.4, including the forwardmost to the fourth ones, are locked onto the rotating roller 14. Among them, three core segments 11.1–11.3, including the forwardmost to the third ones, are located at positions immediately beside the three fliers 18. At this point in time, constrained by the rotating roller 14 and the pairs of guide rollers 21, 22 and bent at the individual connecting members 12, the individual core segments 11 are disposed such that their magnetic pole teeth 11a are positioned on the outside of a bent structure. Here, referring to later-described FIG. 2 showing a state midway in the wire-winding operation, for the convenience of explanation, the rotating roller 14 holds the individual core segments 11 in such positions that the core segments 11.3, 11.5 adjacent to the core segment 11.4, which is currently a subject of the wire-winding operation, would not project in the direction of its magnetic pole tooth 11a (into an area hatched in FIG. 2) beyond a boundary surface S (shown by an alternate long and short dashed line in FIG. 2) including the inside surface 11d of the yoke portion 11c. More specifically, the diameter and other parameters of the rotating roller 14 are determined in relation to the shape and dimensions of the core segments 11 so as to maintain the aforementioned positions of the core segments 11.

Then, the magnet wires 19 are wound around the magnetic pole teeth 11a of the three core segments 11 by operating the fliers 18 to thereby form the coils 20. Subsequently, three core segments 11.4–11.6, including the fourth to the sixth ones, are locked onto the rotating roller 14 as shown in FIG. 2 and the coils 20 are formed by the fliers 18 by reexecuting the same operation as described above. Next, three core segments 11.7–11.9, including the seventh to the ninth ones, are locked onto the rotating roller 14 as shown in FIG. 3 and the coils 20 are formed by the fliers 18. When the coils 20 have been formed on the magnetic pole teeth 11a of all the nine core segments 11 in this manner, the core member 13 is finally bent at the individual connecting members 12 to form an annular shape such that the magnetic pole teeth 11a on which the coils 20 have been formed are positioned on the inside of a bent structure as shown in FIG. 6. Although not specifically illustrated, a stator 23 is completed by fixedly joining both ends of the core member 13 by welding them together, for example.

As seen above, three core segments 11 of the core member 13 are successively locked by the two ratchet wheel 16, 17 of the rotating roller 14 and, constrained by the rotating roller 14 and the pairs of guide rollers 21, 22, the core member 13 is bent at the connecting members 12 in such a way that the individual magnetic pole teeth 11a are positioned on the outside of the bent structure according to the first embodiment. Then, the rotating roller 14 holds the individual core segments 11 in such positions that the core segments 11 adjacent to the core segment 11, which is currently the subject of the wire-winding operation, would not project in the direction of its magnetic pole tooth 11a beyond the boundary surface S including the inside surface 11d of the yoke portion 11c. Since the coils 20 are formed in this condition, it is possible to operate the fliers 18 to wind the magnet wires 19, prevent deformation when winding the magnet wires 19, and eventually achieve improved neatness of alignment of the coils 20.

Also, because the coils 20 are simultaneously formed on three core segments 11, it is needless to say that productivity can be improved, and by attaching jumpers to the coils 20, it becomes possible to further improve the productivity. Depending on production lines, it is not absolutely necessary to simultaneously wind the coils 20 on three core segments 11 but may wind on one core segment 11 after another. Although the rotating roller 14 as shown in FIG. 4 is used as the core member positioner in the above-described construction, it is needless to say that the invention is not limited thereto.

Second Embodiment

Figure 7A:
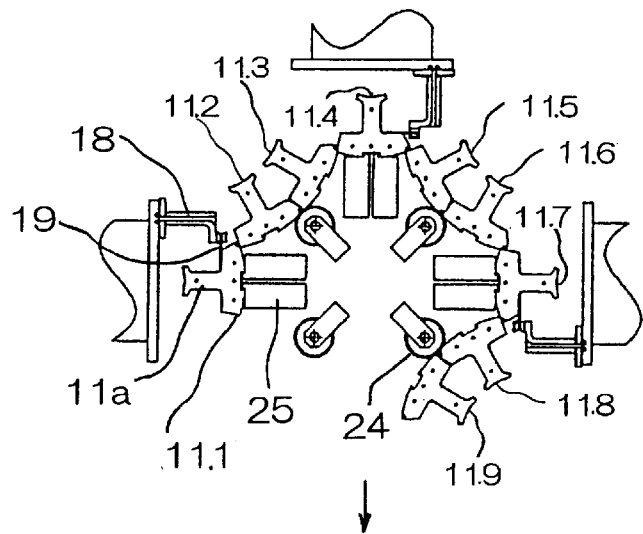
FIGS. 7A to 7C are diagrams showing the construction of a wire-winding machine according to a second embodiment of the present invention and individual processes of wire-winding operation performed by the wire-winding machine.
Figure 7B:
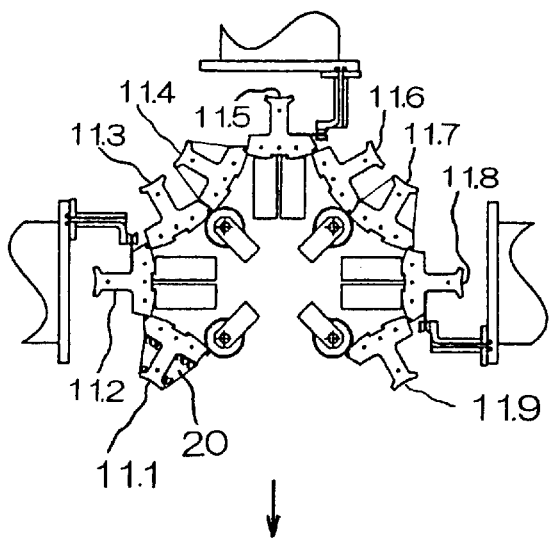
Figure 7C:
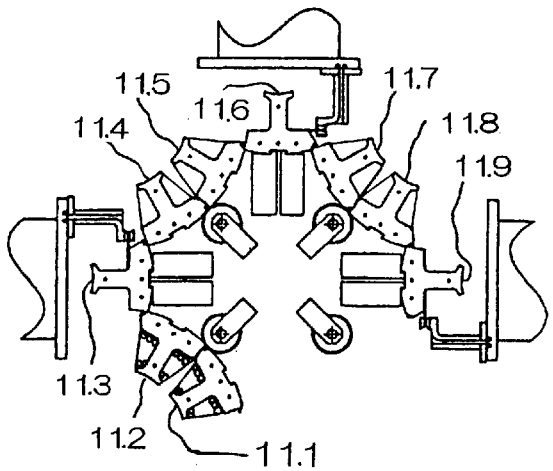

FIGS. 7A to 7C are diagrams showing the construction of a wire-winding machine according to a second embodiment of the present invention and individual processes of wire-winding operation performed by the wire-winding machine; and FIGS. 8A to 8D are diagrams for describing the operation of a core member positioner 26 of the wire-winding machine of FIGS. 7A to 7C.

In these Figures, elements equivalent to those of the first embodiment are designated by the same reference numerals and a description of such elements is omitted. Designated by the numeral 24 are four rotatable retaining rollers serving as retaining members which are disposed with 90° angular intervals in the circumferential direction. These retaining rollers 24 are disposed such that they can move outward in radial directions by a specific distance and go into contact with connecting members 12 joining and located between those core segments 11 which are positioned where coils 20 are wound.

Designated by the numeral 25 are three chucks which are located individually at midpoints between the adjacent retaining rollers 24, constituting the core member positioner 26 together with the retaining rollers 24. These chucks 25 move outward in radial directions by a specific distance and engage locking grooves 11b formed in those core segments 11 which are positioned where locking parts 25a formed at far ends of the chucks 25 are located, thereby locking the core segments 11 in position. Fliers 18 are positioned just beside the individual core segments 11 which are locked by these chucks 25. Designated by the numeral 27 are a plurality of contact members which are located on the outside of the retaining rollers 24 and the chucks 25 with specific angular intervals. Under conditions where the individual retaining rollers 24 have moved outward pushing the individual core segments 11 to the outside, these contact members 27 come into contact with terminal ends of magnetic pole teeth 11a of the respective core segments 11 to thereby hold a core member 13 in annular form. Designated by the numeral 28 are a plurality of clasping members which can grasp the magnetic pole teeth 11a of specific core segments 11 and move the core segments 11 in a circumferential direction by as much as one segment-to-segment interval while the core member 13 is held in the annular form. While the fliers 18 are winding magnet wires 19, the clasping members 28 are held at standby positions where they would not interfere with wire-winding operation together with the contact members 27.

Now, the wire-winding operation of the wire-winding machine of the second embodiment constructed as stated above and core member position setting operation are described with reference to FIGS. 7A–7C and 8A–8D.

Figure 8A:
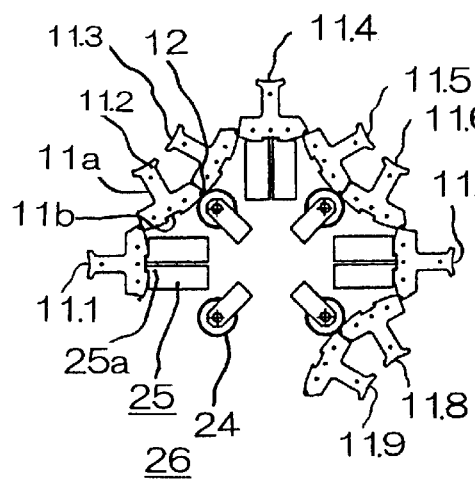
FIGS. 8A to 8D are diagrams for describing the operation of a core member positioner of the wire-winding machine of FIGS. 7A to 7C.

First, the individual chucks 25 move outward and their locking parts 25a fit in the locking grooves 11b of the first, fourth and seventh core segments 11.1, 11.4, 11.7 to lock them in position, as shown in FIG. 8A. Also, the retaining rollers 24 at their original positions go into contact with joints between the second and third core segments 11.2, 11.3, the fifth and sixth core segments 11.5, 11.6, and between the eighth and ninth core segments 11.8, 11.9. As a consequence, the first, fourth and seventh core segments 11.1, 11.4, 11.7 and their adjacent core segments 11.2, etc. are bent such that their magnetic pole teeth 11a are individually positioned on the outside of a bent structure on a common circumference. Also, the second and third core segments 11.2, 11.3, the fifth and sixth core segments 11.5, 11.6 and the eighth and ninth core segments 11.8, 11.9 are brought into positions where they are bent such that their magnetic pole teeth 11a are individually positioned on the inside of a bent structure. Then, as shown in FIG. 7A, the coils 20 are formed by winding the magnet wires 19 by the fliers 18 on the magnetic pole teeth 11a of the first, fourth and seventh core segments 11.1, 11.4, 11.7 which are locked by the individual chucks 25.

Figure 8B:
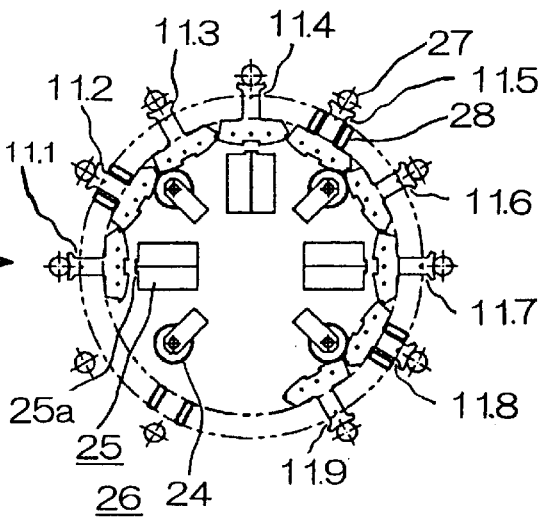

Next, as shown in FIG. 8B, the individual contact members 27 are set at specific positions, the locking parts 25a of the individual chucks 25 are disengaged from the locking grooves 11b of the core segments 11, and the individual retaining rollers 24 are moved outward to push the respective core segments 11. As a consequence, the terminal ends of the individual magnetic pole teeth 11a are brought into contact with the contact members 27, thereby shaping the core member 13 into the annular form. Subsequently, the magnetic pole teeth 11a of the second, fifth and eighth core segments 11.2, 11.5, 11.8 are clamped by the clasping members 28, the retaining rollers 24 are brought back to their original positions as shown in FIG. 8C, and the core member 13 is moved in a circumferential direction by as much as one segment-to-segment interval. As a result, each core segment 11 shifts by one segment-to-segment interval and the second, fifth and eighth core segments 11.2, 11.5, 11.8 are set at positions corresponding to the individual fliers 18 instead of the first, fourth and seventh core segments 11.1, 11.4, 11.7.

Figure 8D:
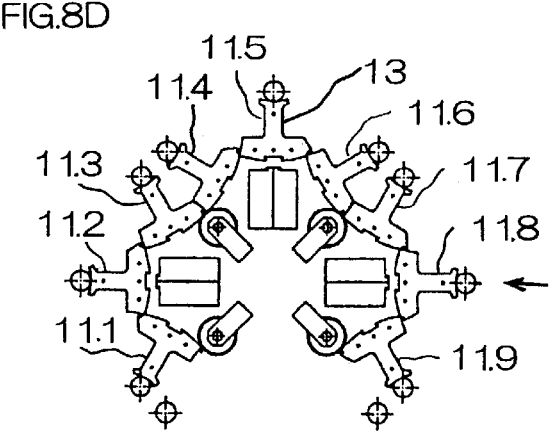
Figure 8C:
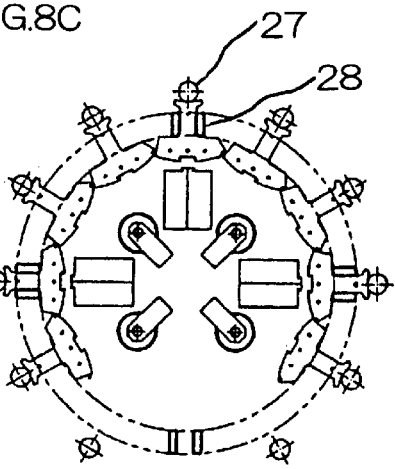
Figure 9:
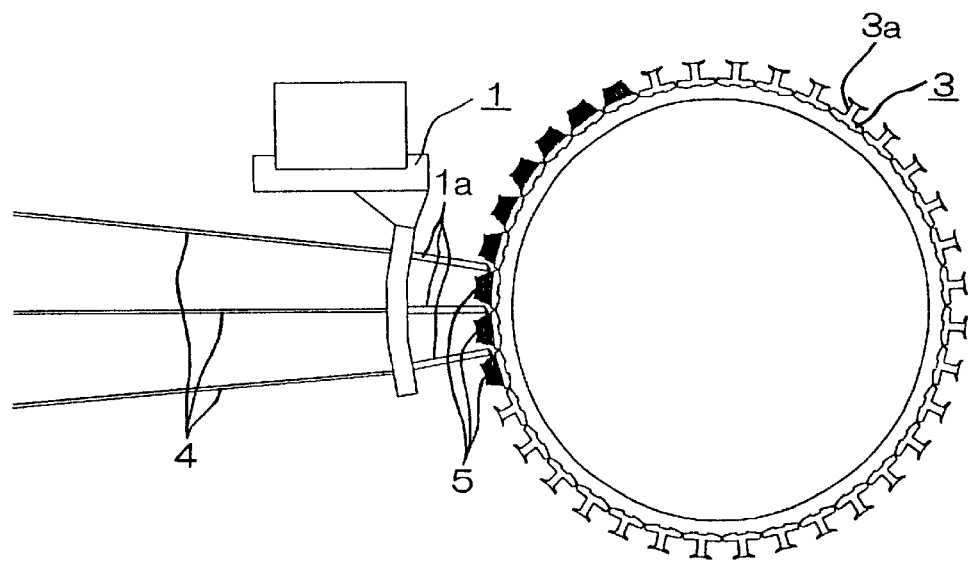
FIG. 9 is a plan view showing the construction of a conventional wire-winding machine.
Figure 10:
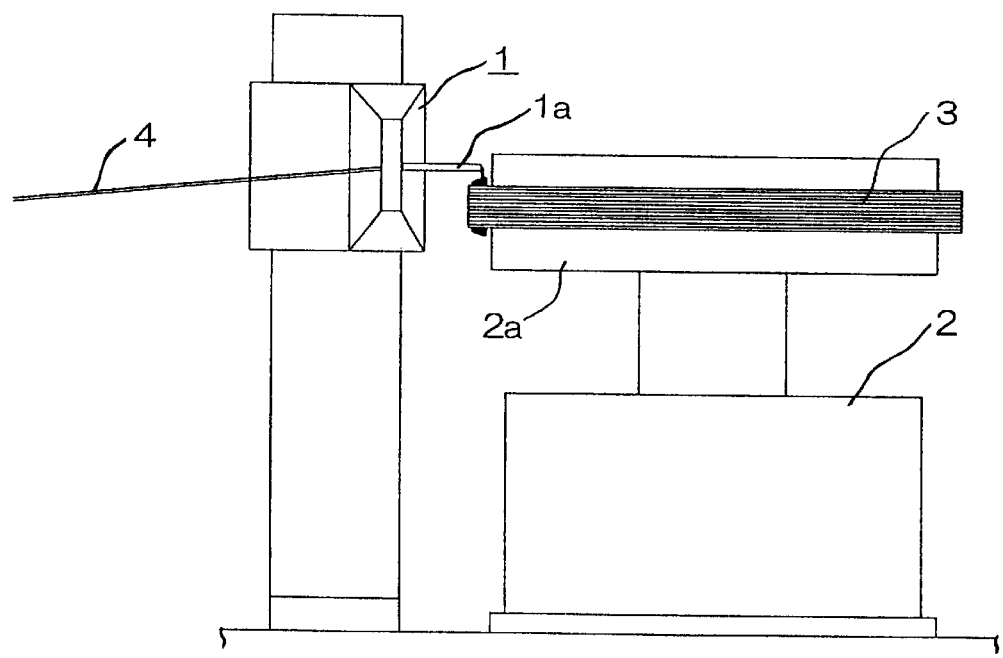
FIG. 10 is a plan view showing also the construction of the conventional wire-winding machine of FIG. 9.
Figure 11:
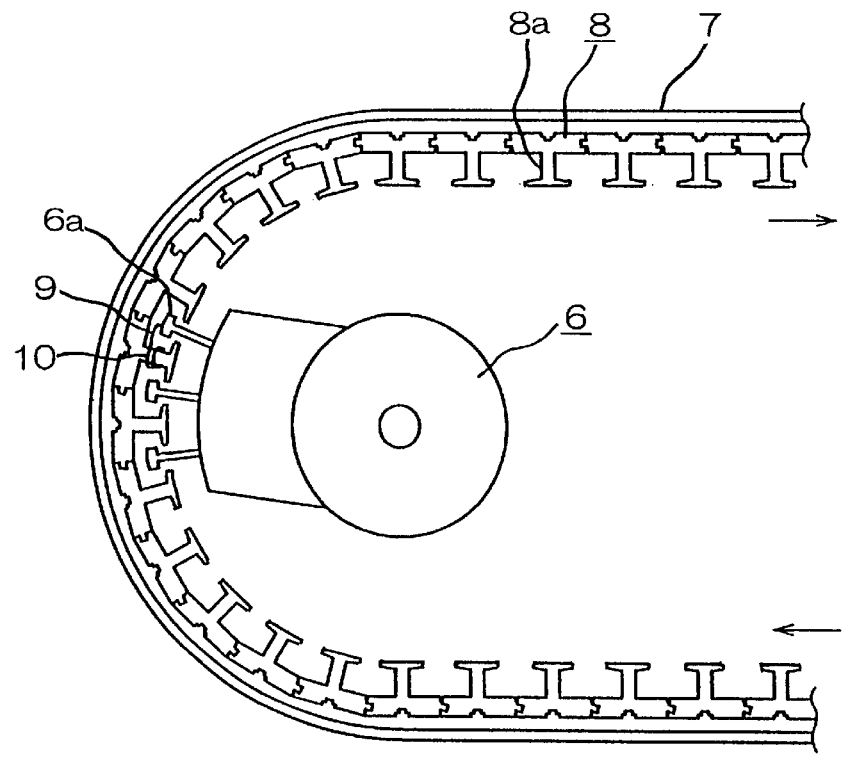
FIG. 11 is a plan view showing a construction different from that of the conventional wire-winding machine of FIG. 9.
Figure 12:
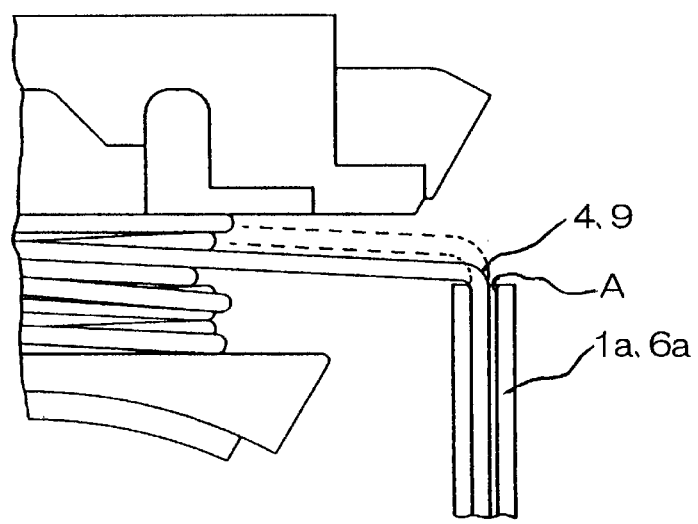
FIG. 12 is a detailed diagram for describing a problem in wire-winding operation performed by the conventional wire-winding machines.

Then, as shown in FIG. 8D, the contact members 27 which are currently in contact with the magnetic pole teeth 11a of the first, third, fourth, sixth, seventh and ninth core segments 11.1, 11.3, 11.4, 11.6, 11.7, 11.9 are moved inward so that joints between the individual core segments 11 go into contact with the retaining rollers 24, whereby the second, fifth and eighth core segments 11.2, 11.5, 11.8 and their adjacent core segments 11.1, etc. are bent such that their magnetic pole teeth 11a are individually positioned on the outside of a bent structure on the common circumference. Also, the third and fourth core segments 11.3, 11.4 and the sixth and seventh core segments 11.6, 11.7 are brought into positions where they are bent such that their magnetic pole teeth 11a are individually positioned on the inside of a bent structure. Then, as shown in FIG. 7B, the individual chucks 25 lock the relevant core segments 11 and the coils 20 are formed by winding the magnet wires 19 by the fliers 18 on the magnetic pole teeth 11a of the second, fifth and eighth core segments 11.2, 11.5, 11.8 in a manner similar to what is shown in FIG. 7A.

Then, by reexecuting core member position altering operation similar to what has been described above, the coils 20 are formed by winding the magnet wires 19 by the fliers 18 on the magnetic pole teeth 11a of the third, sixth and ninth core segments 11.3, 11.6, 11.9 which are locked by the individual chucks 25 as shown in FIG. 7C. When the coils 20 have been formed on the magnetic pole teeth 11a of all the nine core segments 11.1–11.9 in this manner, the core member 13 is finally bent at the individual connecting members 12 to form an annular shape such that the magnetic pole teeth 11a on which the coils 20 have been formed are positioned on the inside in a fashion similar to what is shown in FIG. 6 as described with reference to the foregoing first embodiment. Although not specifically illustrated, a stator is completed by fixedly joining both ends of the core member 13 by welding them together, for example.

As seen above, groups of three core segments 11 (i.e., the first, fourth and seventh ones, the second, fifth and eighth ones, and the third, sixth and ninth ones) of the core member 13 are successively locked by the chucks 25 and, constrained by the chucks 25 and the retaining rollers 24, the core member 13 is bent in the above-described fashion according to the second embodiment. As a consequence, the core segments 11 adjacent to the core segment 11, which is currently the subject of the wire-winding operation, do not project in the direction of its magnetic pole tooth 11a beyond the boundary surface S including the inside surface 11d of the yoke portion 11c. Thus, it is possible to operate the fliers 18 to wind the magnet wires 19, prevent deformation when winding the magnet wires 19, and eventually achieve improved neatness of alignment of the coils 20.

Also, because the coils 20 are simultaneously formed on three core segments 11, it is needless to say that productivity can be improved, and by attaching jumpers to the coils 20, it becomes possible to further improve the productivity. Furthermore, since the coils 20 are formed on every third core segment 11, it is easier to dispose the fliers 18 from the viewpoint of space requirements for installation. Although the groups of every third core segment 11 are successively locked by the chucks 25 with 90° angular intervals in the above-described construction, it is needless to say that the invention is not limited thereto.

What is claimed is:

1. A wire-winding machine for forming coils on an iron core of a rotary electromechanical device, wherein the iron core is constructed of a core member which is formed by joining a plurality of core segments, each of the core segments has a yoke portion and a magnetic pole tooth which is projectingly formed on an inside surface of the yoke portion, each of the coils is formed around the magnetic pole tooth, and the core member is formed by joining both ends of the individual yoke portions by means of connectors which serve as points of bending, said wire-winding machine comprising:

a wire feeder which is constructed to wind the coils on the magnetic pole teeth as wire outlet ends of the wire feeder turn around the individual magnetic pole teeth; and a core member positioner which causes the core member to bend at the connectors in such a way that the magnetic pole teeth are positioned on the outside or inside of a bent structure, and holds the core member in positions where the core segments adjacent to each core segment which is currently a subject of wire-winding operation performed by the wire feeder do not project in the direction of its magnetic pole tooth beyond a boundary surface including the inside surface of the yoke portion of each core segment which is currently a subject of the wire-winding operation during the wire-winding operation.

2. The wire-winding machine according to claim 1, wherein the core member positioner has a mechanism which moves the core member in such a way that the individual core segments are sequentially fed into an operating area of the wire feeder.

3. The wire-winding machine according to claim 1, wherein the core member positioner has a turning device which can bend at least three successive core segments along a peripheral surface and lock them in position in such a way that their magnetic pole teeth are positioned on the outside of the bent structure.

4. The wire-winding machine according to claim 1, wherein the core member positioner includes:

a plurality of chucks which can bend a specific number of the core segments arranged at specific intervals along the core member and the core segments adjacent to those core segments and lock them in position in such a way that their magnetic pole teeth are positioned on the outside of the bent structure; and a retaining device which bends and holds the multiple core segments located between the core segments locked by chucks in such a way that the magnetic pole teeth are positioned on the inside of the bent structure;

wherein the coils are formed around the core segments locked by the chucks.

5. The wire-winding machine according to claim 1, wherein the wire feeder has fliers which guide the wires in such a way that the direction in which each of the wires is let out always matches a radial direction of the relevant magnetic pole tooth at its corresponding wire outlet end.

6. A wire-winding method for forming coils on an iron core of a rotary electromechanical device, wherein the iron core is constructed of a core member which is formed by joining a plurality of core segments, each of the core segments has a yoke portion and a magnetic pole tooth which is projectingly formed on an inside surface of the yoke portion, each of the coils is formed around the magnetic pole tooth, and the core member is formed by joining both ends of the individual yoke portions by means of connectors which serve as points of bending, said wire-winding method comprising the steps of:

bending the core member in such a way that the magnetic pole teeth are positioned on the outside or inside of a bent structure; and forming the coils on one core segment while holding the core segments in positions where the core segments adjacent to said one core segment do not project in the direction of its magnetic pole tooth beyond a boundary surface including the inside surface of the yoke portion of said one core segment.

7. A wire-winding machine for forming coils on an iron core of a rotary electromechanical device, wherein the iron core is constructed of a core member which is formed by joining a plurality of core segments, each of the core segments has a yoke portion and a magnetic pole tooth which is projectingly formed on an inside surface of the yoke portion, each of the coils is formed around the magnetic pole tooth, and the core member is formed by joining both ends of the individual yoke portions by means of connectors which serve as points of bending, said wire-winding machine comprising:

a wire feeder which is constructed to wind the coils on the magnetic pole teeth as wire outlet ends of the wire feeder turn around the individual magnetic pole teeth; and a core member positioner which causes the core member to bend at the connectors in such a way that the magnetic pole teeth are positioned on the outside of a bent structure, and holds the core member in positions where the core segments adjacent to each core segment which is currently a subject of wire-winding operation performed by the wire feeder do not project in the direction of its magnetic pole tooth beyond a boundary surface including the inside surface of the yoke portion of each core segment which is currently a subject of the wire-winding operation during the wire-winding operation.

8. The wire-winding machine according to claim 7, wherein the core member positioner has a mechanism which moves the core member in such a way that the individual core segments are sequentially fed into an operating area of the wire feeder.

9. The wire-winding machine according to claim 7, wherein the core member positioner has a turning device which can bend at least three successive core segments along a peripheral surface and lock them in position in such a way that their magnetic pole teeth are positioned on the outside of the bent structure.

10. The wire-winding machine according to claim 7, wherein the core member positioner includes:

a plurality of chucks which can bend a specific number of the core segments arranged at specific intervals along the core member and the core segments adjacent to those core segments and lock them in position in such a way that their magnetic pole teeth are positioned on the outside of the bent structure; and a retaining device which bends and holds the multiple core segments located between the core segments locked by the chucks in such a way that the magnetic pole teeth are positioned on the inside of the bent structure;

wherein the coils are formed around the core segments locked by the chucks.

11. The wire-winding machine according to claim 7, wherein the wire feeder has fliers which guide the wires in such a way that the direction in which each of the wires is let out always matches a radial direction of the relevant magnetic pole tooth at its corresponding wire outlet end.

12. A wire-winding method for forming coils on an iron core of a rotary electromechanical device, wherein the iron core is constructed of a core member which is formed by joining a plurality of core segments, each of the core segments has a yoke portion and a magnetic pole tooth which is projectingly formed on an inside surface of the yoke portion, each of the coils is formed around the magnetic pole tooth, and the core member is formed by joining both ends of the individual yoke portions by means of connectors which serve as points of bending, said wire-winding method comprising the steps of:

bending the core member in such a way that the magnetic pole teeth are positioned on the outside of a bent structure; and forming the coils on one core segment while holding the core segments in positions where the core segments adjacent to said one core segment do not project in the direction of its magnetic pole tooth beyond a boundary surface including the inside surface of the yoke portion of said one core segment.

* * * * *